(12) United States Patent
Roberts

(10) Patent No.: US 10,612,491 B2
(45) Date of Patent: Apr. 7, 2020

(54) MOUNTING DEVICE WITH PIN ACTUATOR

(71) Applicant: Rohr, Inc., Chula Vista, CA (US)

(72) Inventor: Christopher J. Roberts, El Cajon, CA (US)

(73) Assignee: Rohr, Inc., Chula Vista, CA (US)

( * ) Notice: Subject to any disclaimer, the term of this patent is extended or adjusted under 35 U.S.C. 154(b) by 362 days.

(21) Appl. No.: 15/714,411

(22) Filed: Sep. 25, 2017

(65) Prior Publication Data

US 2019/0093600 A1    Mar. 28, 2019

(51) Int. Cl.
| | |
|---|---|
| *F02K 1/76* | (2006.01) |
| *B64D 33/04* | (2006.01) |
| *B64D 29/06* | (2006.01) |
| *F02K 1/72* | (2006.01) |

(52) U.S. Cl.
CPC .............. *F02K 1/763* (2013.01); *B64D 29/06* (2013.01); *B64D 33/04* (2013.01); *F02K 1/72* (2013.01); *F05D 2220/323* (2013.01); *F05D 2250/36* (2013.01); *F05D 2260/30* (2013.01)

(58) Field of Classification Search
CPC . F02K 1/763; F02K 1/72; B64D 29/06; F05D 2220/323; F05D 2260/30
USPC .......................................................... 244/54
See application file for complete search history.

(56) References Cited

U.S. PATENT DOCUMENTS

| | | | | |
|---|---|---|---|---|
| 4,428,609 A | * | 1/1984 | Baehr .................... | B64D 29/06 292/251 |
| 4,519,561 A | * | 5/1985 | Timms .................... | F02K 1/605 239/265.33 |
| 5,213,286 A | * | 5/1993 | Elliott .................... | B64D 29/06 16/368 |
| 5,481,797 A | | 1/1996 | Barker | |
| 6,666,307 B1 | * | 12/2003 | Christensen ........... | B64D 33/04 188/134 |
| 2010/0218480 A1 | * | 9/2010 | Vauchel ................. | B64D 29/06 60/226.2 |
| 2011/0110705 A1 | * | 5/2011 | Soulier .................. | B64D 27/26 403/2 |
| 2011/0133489 A1 | * | 6/2011 | Hemeury ............... | B64D 29/06 292/97 |
| 2012/0003095 A1 | | 1/2012 | Yoshida et al. | |

(Continued)

FOREIGN PATENT DOCUMENTS

| | | | | |
|---|---|---|---|---|
| CA | 2536693 A1 | * | 5/2005 | ......... E05B 47/0607 |
| WO | WO-2010026302 A1 | * | 3/2010 | ............. B64D 29/06 |

*Primary Examiner* — Christopher P Ellis

(74) *Attorney, Agent, or Firm* — Getz Balich LLC

(57) ABSTRACT

An assembly is provided that includes an inner support, an intermediate support, an outer support, first and second pins and a pin actuator. The intermediate support circumscribes and rotatably attaches to the inner support about a first axis. The outer support includes a first flange and a second flange. The intermediate support is laterally between the first flange and the second flange. The first and the second pins rotatably attach the intermediate support to the outer support about a second axis. The first pin is arranged with the first flange, and the second pin is arranged with the second flange. The pin actuator includes a drive element projecting laterally through the outer support. The pin actuator is configured to translate the second pin along the second axis upon rotation of the drive element about a rotational axis thereof.

20 Claims, 9 Drawing Sheets

(56) References Cited

U.S. PATENT DOCUMENTS

| | | | | |
|---|---|---|---|---|
| 2012/0138707 | A1* | 6/2012 | Vauchel | F02K 1/72 |
| | | | | 239/265.29 |
| 2013/0232768 | A1* | 9/2013 | Suciu | F02C 7/20 |
| | | | | 29/525.01 |
| 2013/0292489 | A1* | 11/2013 | Vauchel | F02K 1/09 |
| | | | | 239/265.19 |
| 2014/0234090 | A1* | 8/2014 | Hurlin | B64D 29/06 |
| | | | | 415/182.1 |
| 2014/0245716 | A1* | 9/2014 | Gonidec | F02K 1/70 |
| | | | | 60/226.2 |
| 2015/0082927 | A1* | 3/2015 | Werquin | F02K 1/09 |
| | | | | 74/89.39 |
| 2015/0097056 | A1* | 4/2015 | Caruel | F02K 1/09 |
| | | | | 239/265.19 |
| 2015/0369083 | A1* | 12/2015 | Mercier | B64D 29/06 |
| | | | | 415/214.1 |
| 2015/0377071 | A1* | 12/2015 | Sawyers-Abbott | F01D 25/28 |
| | | | | 60/805 |
| 2016/0229546 | A1* | 8/2016 | Chavignier | B64D 29/06 |
| 2017/0107944 | A1* | 4/2017 | Kawai | F02K 1/763 |
| 2017/0226962 | A1* | 8/2017 | Crawford | F04D 29/522 |
| 2018/0079517 | A1* | 3/2018 | Peyron | B64D 29/00 |
| 2018/0135557 | A1* | 5/2018 | Pouyau | F02K 3/075 |
| 2018/0141673 | A1* | 5/2018 | Lu | B64D 29/06 |
| 2019/0055902 | A1* | 2/2019 | Stone | B64D 29/00 |
| 2019/0120172 | A1* | 4/2019 | Gormley | F02K 1/763 |
| 2019/0135446 | A1* | 5/2019 | Alcalan | F16B 21/12 |
| 2019/0195170 | A1* | 6/2019 | Patsouris | F02K 1/72 |
| 2019/0264706 | A1* | 8/2019 | Awtry | F02C 3/06 |
| 2019/0293023 | A1* | 9/2019 | Guerinot | F02K 1/72 |
| 2019/0308739 | A1* | 10/2019 | Messina | B64D 29/06 |

* cited by examiner

MOUNTING DEVICE WITH PIN ACTUATOR

BACKGROUND

1. Technical Field

This disclosure relates generally to a mounting device for, for example, a thrust reverser system.

2. Background Information

Various mounting devices are known in the art for mounting, for example, a linear actuator to another component of an aircraft propulsion system nacelle. While these known mounting devices have various benefits, there is still room in the art for improvement.

SUMMARY OF THE DISCLOSURE

According to an aspect of the present disclosure, an assembly is provided that includes an inner support, an intermediate support, an outer support, first and second pins and a pin actuator. The intermediate support circumscribes and rotatably attaches to the inner support about a first axis. The outer support includes a first flange and a second flange. The intermediate support is laterally between the first flange and the second flange. The first and the second pins rotatably attach the intermediate support to the outer support about a second axis. The first pin is arranged with the first flange. The second pin is arranged with the second flange. The pin actuator includes a drive element projecting laterally through the outer support. The pin actuator is configured to translate the second pin along the second axis upon rotation of the drive element about a rotational axis thereof.

According to another aspect of the present disclosure, another assembly is provided that includes an inner support, an intermediate support, an outer support, first and second pins and a pin actuator. The intermediate support circumscribes and is rotatably mounted to the inner support about a first axis. The outer support includes a first flange and a second flange. The intermediate support is arranged laterally between the first flange and the second flange. The first and the second pins rotatably mount the intermediate support to the outer support about a second axis. The first pin project through the first flange to the intermediate support. The second pin project through the second flange to the intermediate support. The pin actuator is configured to enable disconnection of the first pin and the second pin from the inter intermediate support from a common side of the outer support.

The rotational axis may be parallel with the second axis.

The first axis may be perpendicular to and coincident with the second axis.

The outer support, the intermediate support and the inner support may be arranged together to provide a gimbal joint.

The pin actuator may also include a carriage. The drive element may include a leadscrew that is mated with the carriage at a threaded interface. The second pin may be mounted to the carriage.

The threaded interface between the leadscrew and the carriage may convert rotational motion of the leadscrew to axial translation of the carriage.

The carriage may be located adjacent the second flange and laterally outside of the outer support. The second pin may project laterally out from the carriage, through an aperture in the second flange, and into a first aperture in the intermediate support. The first pin may project laterally through an aperture in the first flange and into a second aperture in the intermediate support.

The pin actuator may also include a stop configured with the leadscrew and adapted to prevent the second pin from coming out of the aperture in the second flange.

The carriage may be configured with one or more guide pins. Each of the one or more guide pins may project laterally into a respective guide pin aperture in the second flange.

The pin actuator may also include a first gear and a second gear. The first gear may be mounted to the drive element. The second gear may be configured to be driven by the first gear and mated with the second pin at a threaded interface.

The threaded interface between the second gear and the second pin may convert rotational motion of the second gear to axial translation of the second pin.

The pin actuator may also include a retainer. The first gear and the second gear may be laterally captured between the outer support and the retainer.

A bushing may be included and may be in an aperture in the second flange. The second pin may project through the bushing.

The assembly may also include a component of an aircraft propulsion system nacelle and a linear actuator. The outer support may be mounted to the component and the inner support is mounted to the linear actuator.

The outer support may extend laterally between a first side and a second side. The first flange may be located at the first side. The second flange may be located at the second side. The pin actuator may be configured to enable disconnection of the first pin and the second pin from the intermediate support from the first side without access to the second side.

The pin actuator may include a drive element projecting laterally through the outer support. The pin actuator may be further configured to translate the second pin along the second axis upon rotation of the drive element about a rotational axis thereof.

The pin actuator may include a rotatable leadscrew and a carriage. The rotatable leadscrew may be mated with the carriage at a threaded interface. The second pin may be axially fixedly mounted to the carriage.

The pin actuator may include a rotatable driveshaft, a first gear and a second gear. The first gear may be mounted to the rotatable driveshaft. The second gear may be meshed with the first gear and mated with the second pin at a threaded interface.

The foregoing features and the operation of the invention will become more apparent in light of the following description and the accompanying drawings.

DETAILED DESCRIPTION

Figure 1:
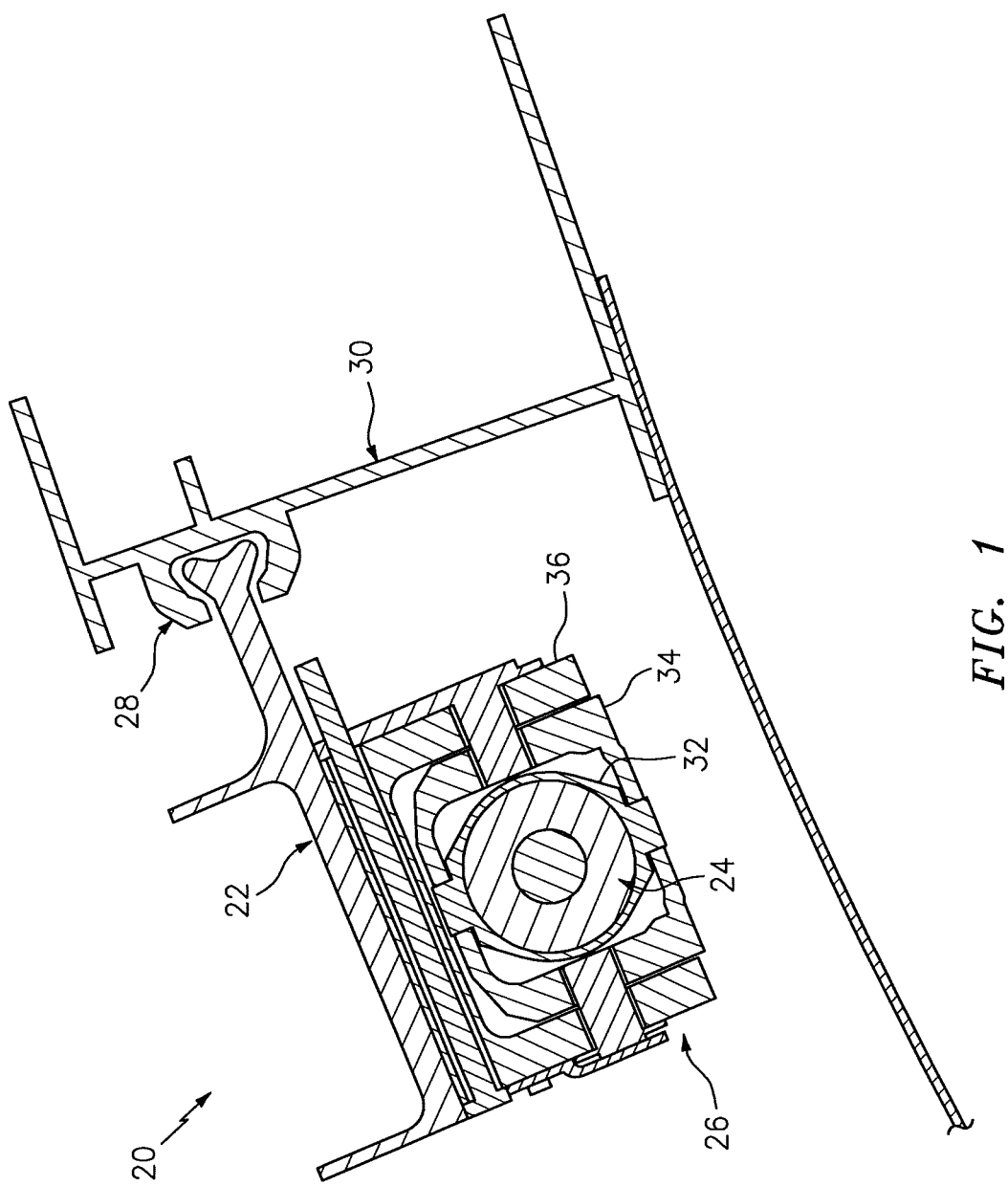
FIG. 1 is a partial cross-sectional illustration of a portion of an aircraft propulsion system nacelle assembly.

FIG. 1 illustrates an assembly 20 of an aircraft propulsions system. This assembly 20 includes a first component 22 of an aircraft propulsions system nacelle, a second component 24 of the aircraft propulsions system nacelle, and a mounting device 26 configured to mount the second component 24 to the first component 22.

The first component 22 of FIG. 1 is configured as a translating sleeve slide rail, which is mated with and translatable along a track rail 28 on a hinge beam 30. The second component 24 of FIG. 1 is configured as a linear actuator (e.g., a piston or leadscrew actuator) operable to translate a translating sleeve (not shown) of the aircraft propulsions system nacelle between a deployed position and a stowed position, where the translating sleeve is mounted to the slide rail. The present disclosure, however, is not limited to the foregoing exemplary first and second component configurations. For example, the first component 22 and/or the second component 24 can alternatively be configured as other components of the nacelle or, more generally, other components the aircraft propulsion system or another type device, where those other components can be connected to one another with the mounting device 26.

Figure 2:
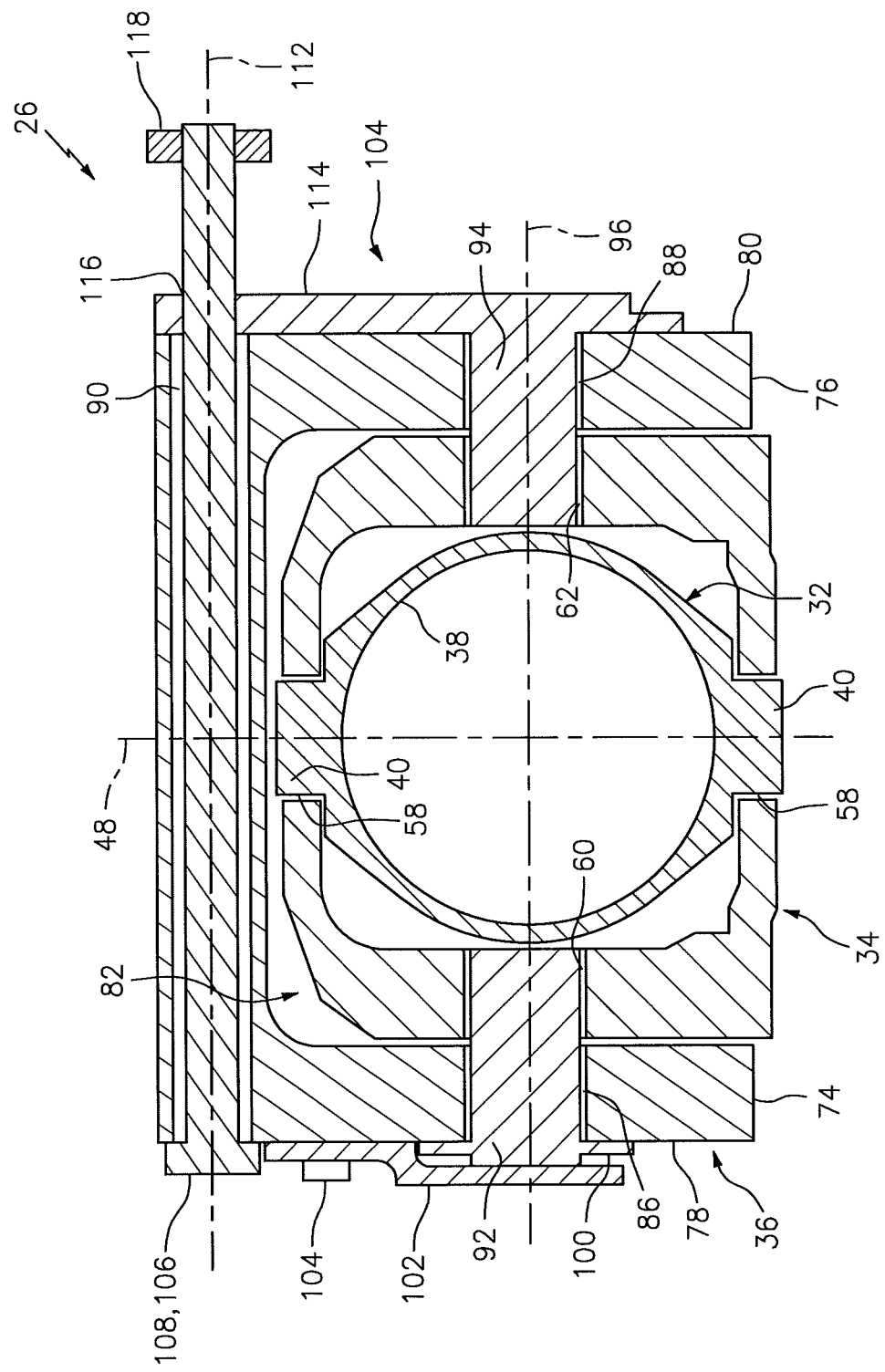
FIG. 2 is a cross-sectional illustration of a mounting device.

Referring to FIG. 2, the mounting device 26 includes an (e.g., annular) inner support 32, an (e.g., annular) intermediate support 34 and an outer support 36. The mounting device 26 also includes mounting hardware for mounting the elements 32, 34 and 36 together as described below in further detail.

Figure 3:
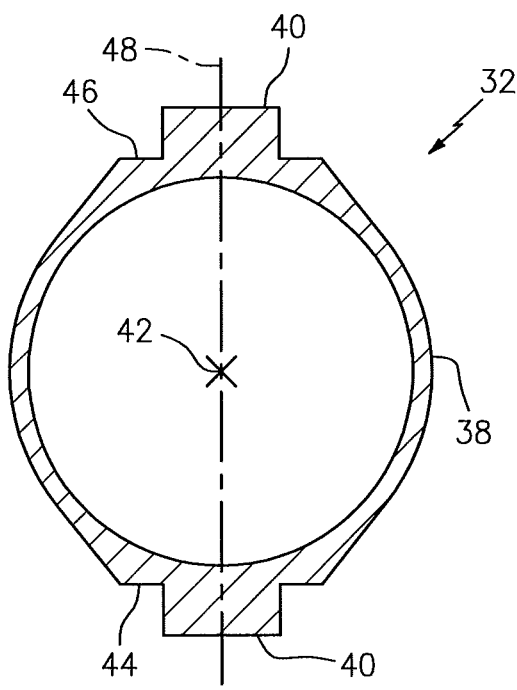
FIG. 3 is a cross-sectional illustration of an inner support of the mounting device of FIG. 2.

Referring to FIG. 3, the inner support 32 may be configured as a gimbal joint support ring. The inner support 32 of FIG. 3, for example, includes an annular inner support base 38 and one or more projections 40 (e.g., cylindrical pins). The inner support base 38 extends circumferentially around an inner support centerline 42 thereby providing the inner support 32 with a full hoop body. The projections 40 are connected to (e.g., formed integral with or attached to) the inner support base 38. The projections 40 are arranged on opposing vertical sides 44 and 46 of the inner support base 38. Each of the projections 40 projects radially outward, relative to the inner support centerline 42, from the inner support base 38 to a distal projection end. The projections 40 are coaxial with one another and, thereby, collectively define a rotational (or pivot) inner support axis 48.

Figure 4:
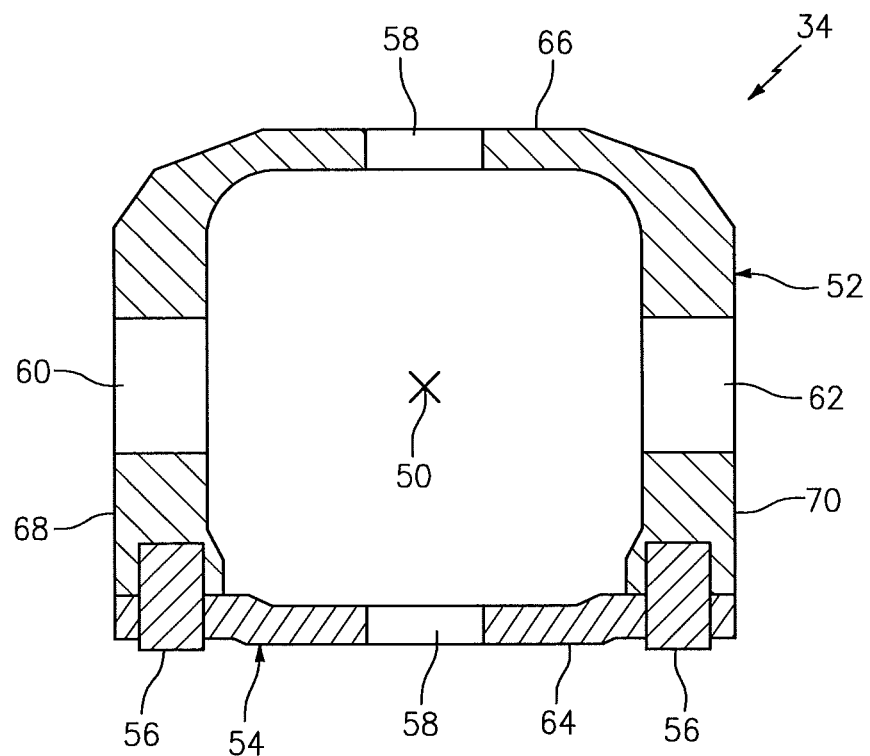
FIG. 4 is a cross-sectional illustration of an intermediate support of the mounting device of FIG. 2.

Referring to FIG. 4, the intermediate support 34 may be configured as a gimbal joint support ring. The intermediate support 34 of FIG. 4, for example, extends circumferentially around an intermediate support centerline 50 thereby providing the intermediate support 34 with a full hoop body. This intermediate support 34 of FIG. 4 has a segmented body formed by a generally U-shaped intermediate support base 52 and an end plate 54, which end plate 54 is attached to the intermediate support base 52 by one or more fasteners 56. Of course, in other embodiments, the intermediate support 34 may have a non-segmented, monolithic body where, for example, one or more of the projections 40 (see FIG. 2) are alternatively configured as discrete removable pins.

Referring again to FIG. 4, the intermediate support 34 is configured with one or more projection apertures 58 and one or more inner pin apertures 60 and 62. Each of these apertures 58, 60 and 62 may extend radially, relative to the intermediate support centerline 50, through the intermediate support 34. The projection apertures 58 are arranged on opposing vertical sides 64 and 66 of the intermediate support 34. The inner pin apertures 60 and 62 are arranged on opposing lateral sides 68 and 70 of the intermediate support 34.

Figure 5:
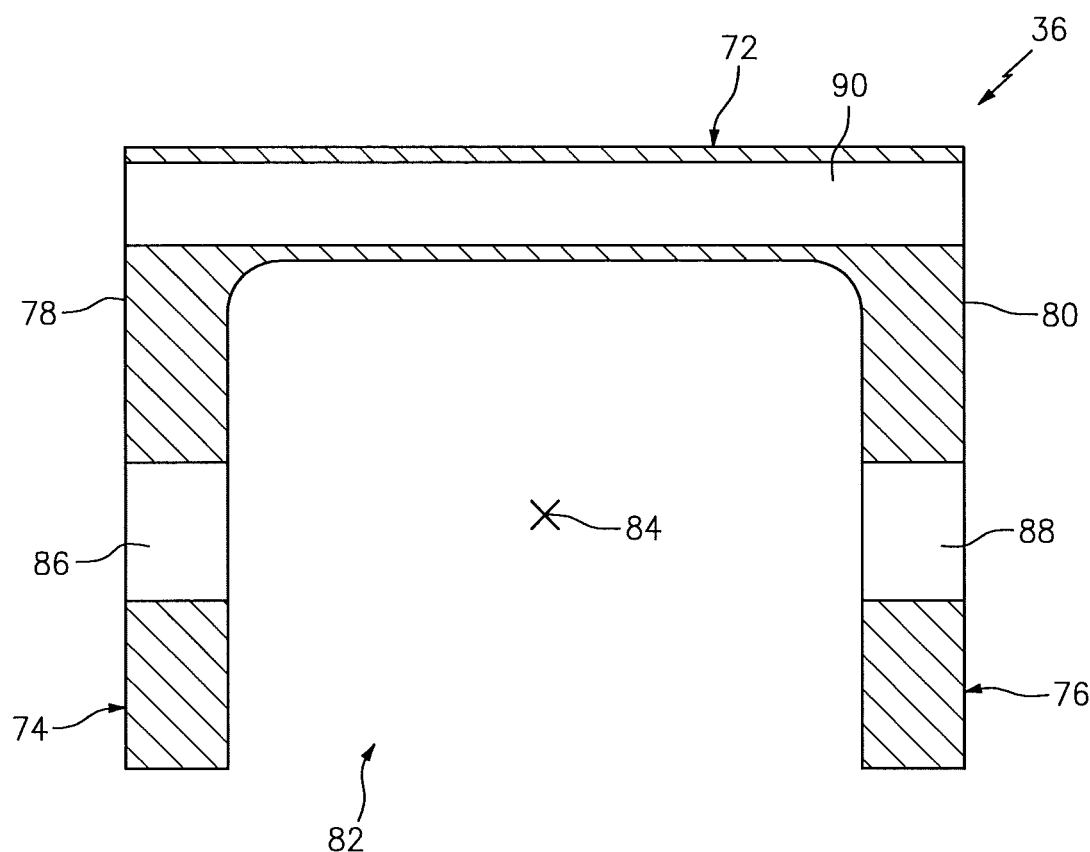
FIG. 5 is a cross-sectional illustration of an outer support of the mounting device of FIG. 2.

Referring to FIG. 5, the outer support 36 may be configured as a gimbal support base. The outer support 36 of FIG. 5, for example, has a generally U-shaped body formed by an outer support base 72 (e.g., a base plate), a first flange 74 and a second flange 76. The outer support base 72 extends laterally between a first side 78 of the outer support 36 and a second side 80 of the outer support 36. The first flange 74 and the second flange 76 are each connected to (e.g., formed integral with or attached to) the outer support base 72. The first flange 74 is located at (e.g., on, adjacent or proximate) the first side 78. The first flange 74 projects vertically out from the outer support base 72 to a first flange distal end. The second flange 76 is located at (e.g., on, adjacent or proximate) the second side 80. The second flange 76 projects vertically out from the outer support base 72 to a second flange distal end. The first flange 74 is laterally separated from the second flange 76 by a lateral distance thereby forming a channel 82. This channel 82 extends laterally within the outer support 36 between the flanges 74 and 76. The channel 82 extends vertically into the outer support 36 to the outer support base 72. The channel 82 extends longitudinally through the outer support 36 along an outer support centerline 84.

The outer support 36 is configured with one or more outer pin apertures 86 and 88 and a drive element aperture 90. The outer pin apertures 86 and 88 extend radially, relative to the outer support centerline 84, through the outer support 36 and, more particularly, respectively through the flanges 74 and 76. The outer pin apertures 86 and 88 are respectively arranged on the opposing lateral sides 78 and 80, where the first outer pin aperture 86 is located at the first side 78 and the second outer pin aperture 88 is located at the second side 80. The drive element aperture 90 extends laterally through the outer support 36 and, for example, through the outer support base 72 between the first side 78 and the second side 80 as shown in FIG. 5.

Referring to FIG. 2, the second component 24 is arranged with (e.g., in a bore of) the inner support 32. The second component 24 is also attached to the inner support 32. The outer support 36 is mounted to the first component 22.

The inner support 32 is disposed within a central bore of the intermediate support 34 such that the intermediate support 34 circumscribes the inner support 32. The inner support 32 is mounted to the intermediate support 34 by the projections 40. More particularly, the projections 40 project radially out from the inner support 32 and respectively into the projection apertures 58. With this configuration, the inner support 32 is operable to rotate (or pivot) about the inner support axis 48. The inner support 32 therefore is rotatably attached to the intermediate support 34 about the inner support axis 48.

The intermediate support 34 is disposed within the channel 82 and laterally between the first flange 74 and the second flange 76. The intermediate support 34 is mounted to the outer support 36 by one or more removable pins 92 and 94. The first pin 92 is mated with (e.g., extends through) the first outer pin aperture 86 and projects radially into the first inner pin aperture 60. The second pin 94 is mated with (e.g., extends through) the second outer pin aperture 88 and projects radially into the second inner pin aperture 62, where the pins 92 and 94 are coaxial with one another and, thereby, collectively define a rotational (or pivot) outer support axis 96. With this configuration, the intermediate support 34 is operable to rotate (or pivot) about the outer support axis 96. The intermediate support 34 therefore is rotatably attached to the outer support 36 about the outer support axis 96.

The outer support axis 96 is substantially perpendicular to and is coincident with the inner support axis 48. The mounting device 26 of FIG. 2 therefore may be referred to as a gimbal joint.

The first pin 92 of FIG. 2 with configured with a retainer 100. More particularly, the first pin 92 of FIG. 2 is connected (e.g., formed integral with or attached to) the retainer 100. The first pin 92 projects axially along the outer support axis 96 from the retainer 100 and through/into the apertures 86 and 60 as described above. The first pin 92 is secured to the first flange 74 by a capture plate 102. This capture plate 102 is mounted to the outer support 36, for example the first flange 74, by one or more fasteners 104. The retainer 100 is disposed and sandwiched laterally between the capture plate 102 and the first flange 74, thereby substantially preventing the first pin 92 from moving along the outer support axis 96 during propulsion system operation. However, during assembly and disassembly, the capture plate 102 may be detached from the outer support 36 such that the first pin 92 may be slide out from one or both of the apertures 86 and 60.

Figure 6A:
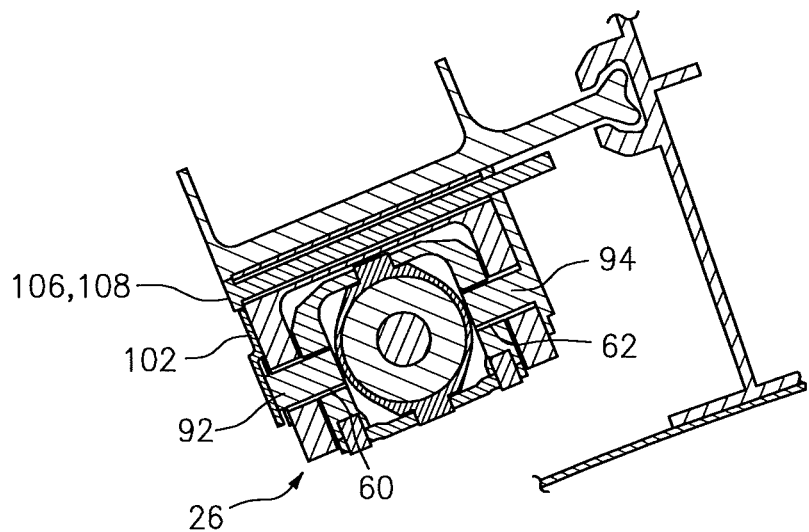
FIGS. 6A-6C are cross-sectional illustrations of the mounting device depicting a sequence of disengaging pins form the intermediate support.
Figure 6B:
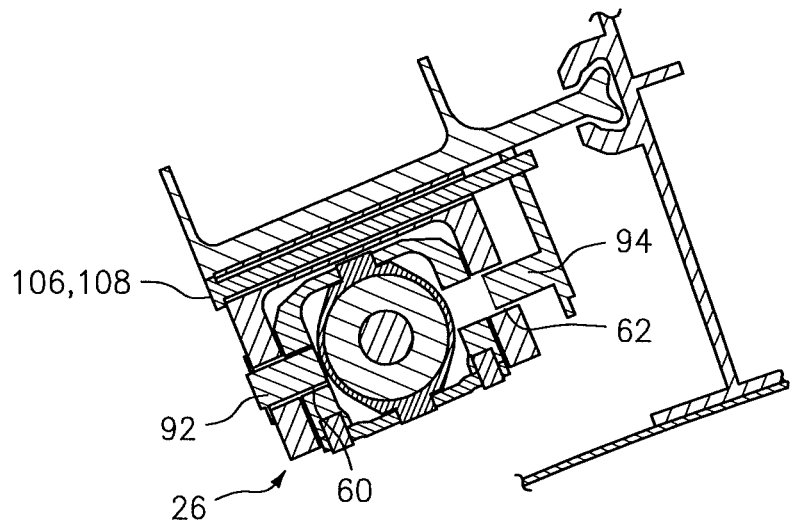
Figure 6C:
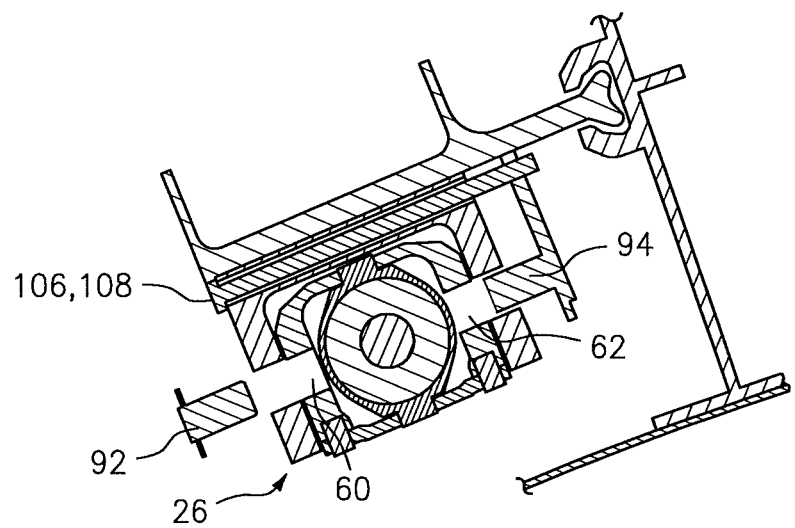
Figure 8:
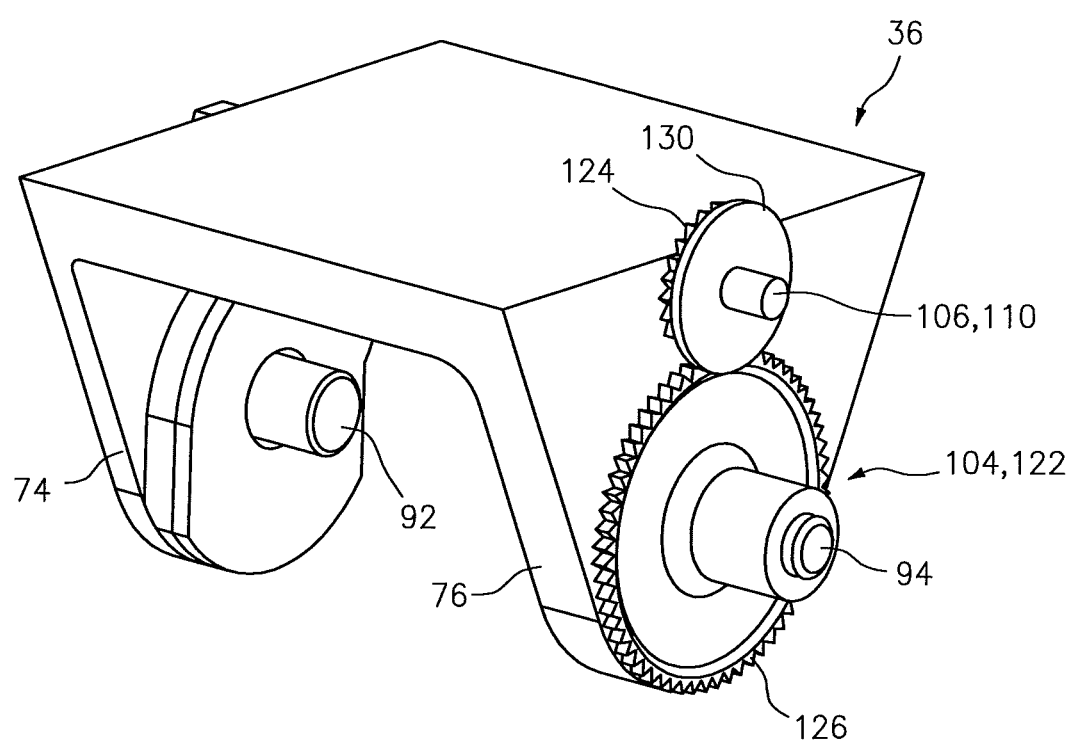
FIG. 8 is a perspective illustration of a portion of another mounting device.
Figure 9:
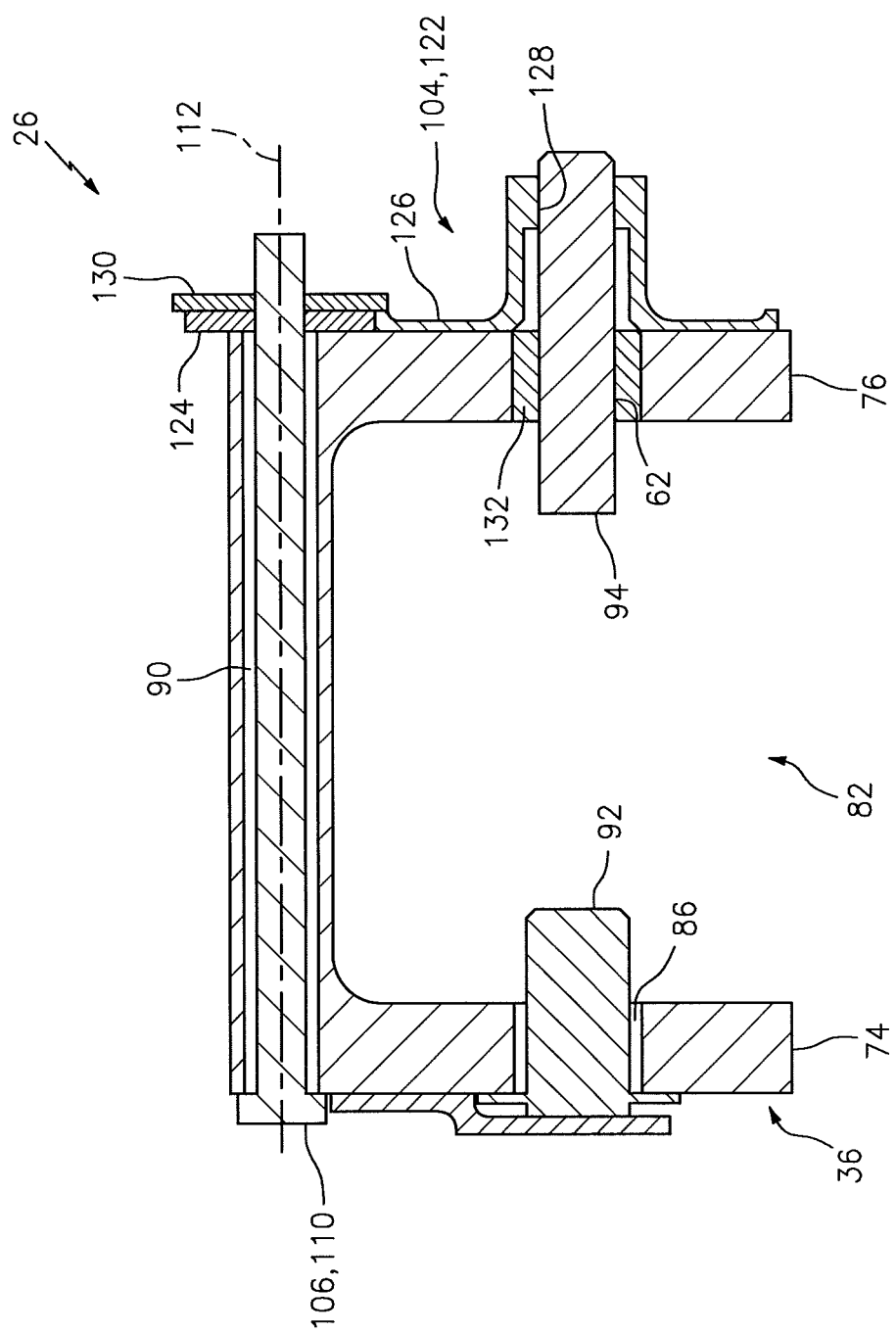
FIGS. 9 and 10 are cross-sectional illustrations of the mounting device portion of FIG. 8 depicting a sequence of laterally translating a mounting pin.
Figure 10:
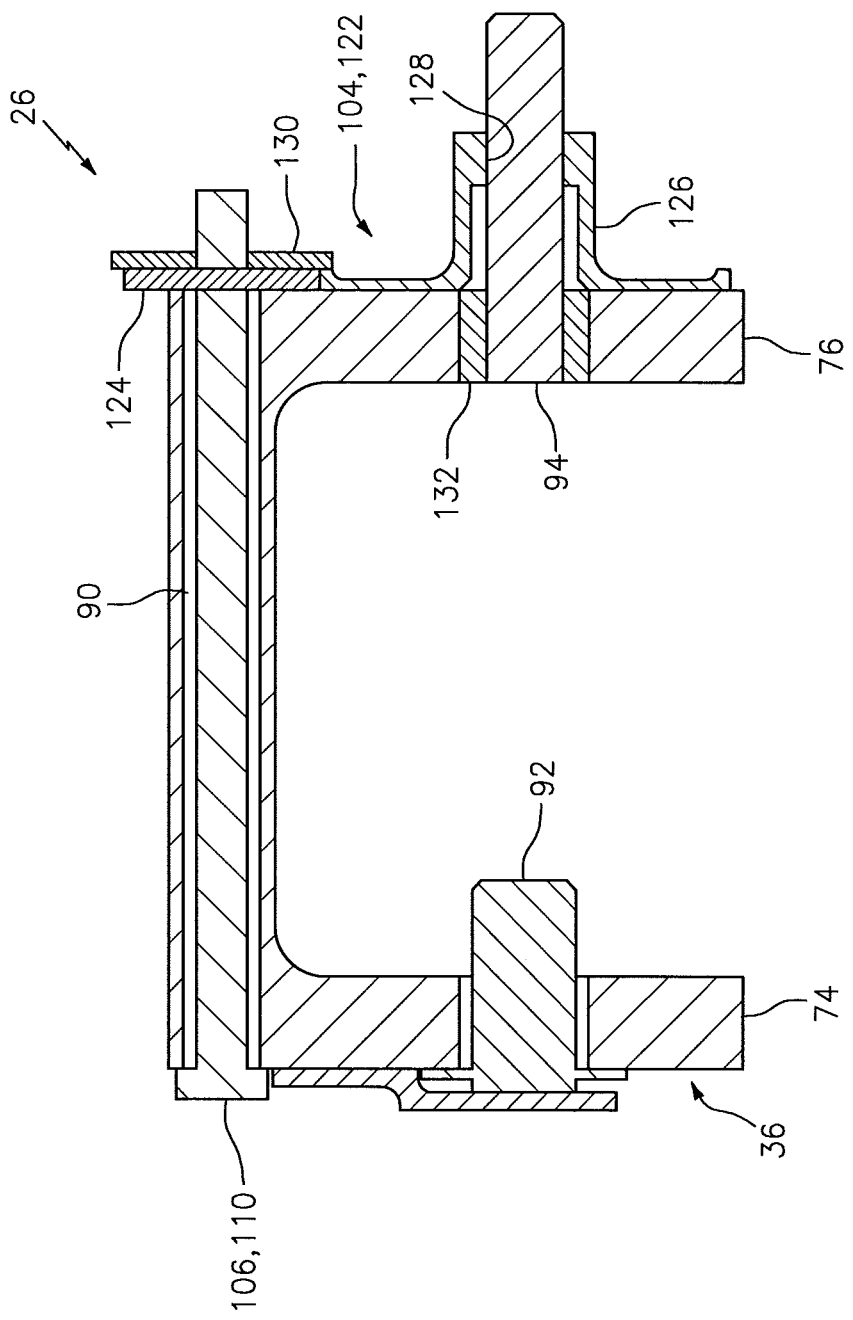

The second pin 94 of FIG. 2 is configured with a pin actuator 104. This pin actuator 104 includes a drive element 106 (e.g., a leadscrew 108 as shown in FIG. 2, or a driveshaft 110 as shown in FIGS. 8 and 9). This drive element 106 is mated with the drive element aperture 90. More particularly, the drive element 106 of FIG. 2 projects laterally along a rotational axis 112 thereof through the drive element aperture 90 and, thus, the outer support 36. The pin actuator 104 of FIGS. 2 and 9 is configured to translate the second pin 94 along the outer support axis 96 upon rotation of the drive element 106 about its rotational axis 112. This operability enables the second pin 94 to be engaged with and disengaged from the second inner pin aperture 62 from the first side 78 of the outer support 36; e.g., the sequence in FIGS. 6A-6C and the sequence in FIGS. 9 and 10. Thus, both the first pin 92 and the second pin 94 may be inserted into or removed from the inner pin apertures 60 and 62 from a common side (e.g., the first side 78) of the outer support 36 without requiring access to another (e.g., the second side 80) of the outer support 36.

In the specific embodiment of FIG. 2, the pin actuator 104 includes a carriage 114 (e.g., a follower) located adjacent and laterally outside of the outer support 36. This carriage 114 mechanically couples the drive element 106, here the leadscrew 108, to the second pin 94. The carriage 114, for example, is at least axially (or completely) fixedly mounted to the carriage 114; e.g., the second pin 94 may be formed integral with the carriage 114. A threaded portion of the leadscrew 108 is mated with (e.g., screwed into) a threaded aperture 116 in the carriage 114. This threaded interface between the leadscrew 108 and the carriage 114 is operable to convert rotational motion of the leadscrew 108 into axial translation of the carriage 114 and, thereby, the second pin 94.

The leadscrew 108 may (or may not) be configured with a stop 118 as shown. This stop 118 may be configured as a nut secured to the leadscrew 108 at its distal end. With this configuration, the nut may prevent the second pin 94 from coming out of the second outer pin aperture 88.

Figure 7:
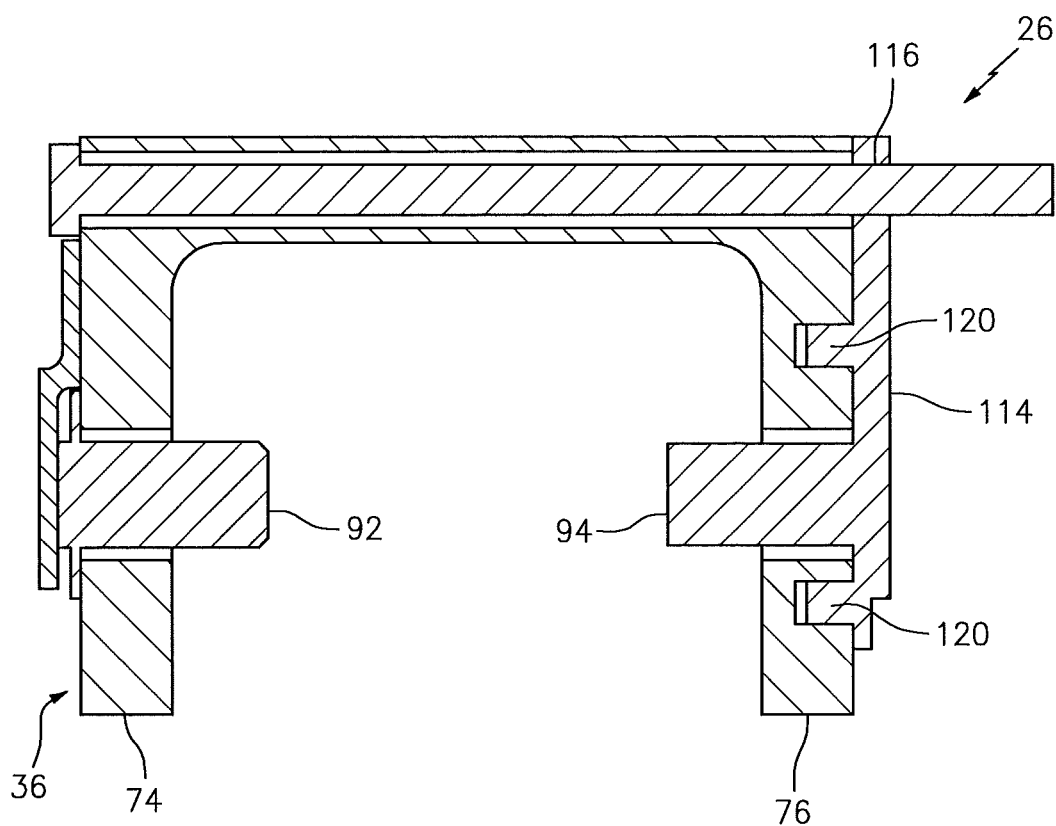
FIG. 7 is a cross-sectional illustration of a portion of another mounting device.

Referring to FIG. 7, the carriage 114 may be configured with one or more guide pins 120. Each of these guide pins 120 projects laterally into a respective guide pin aperture in the second flange 76. These guide pins 120 may ensure the carriage 114 and, thus, the second pin 94 move substantially only axially along the outer support axis 96 during movement thereof.

Now referring to the specific embodiment of FIG. 9, the pin actuator 104 includes a gear system 122 located adjacent and laterally outside of the outer support 36. This gear system 122 mechanically couples the drive element 106, here the driveshaft 110, to the second pin 94. The gear system 122 of FIG. 9 includes a first gear 124 and a second gear 126. The first gear 124 is mounted to the drive element 106 such that rotation of the drive element 106 about the rotational axis 112 drives rotation of the first gear 124 about the rotational axis 112. The second gear 126 is meshed with and, thus, configured to be driven by the first gear 124. The second gear 126 includes a threaded inner bore portion 128, which is mated with a threaded portion of the second pin 94. This threaded interface between the second gear 126 and the second pin 94 is operable to convert rotational motion of the second gear 126 into axial translation of the second pin 94.

The gear system 122 may (or may not) be configured with a retainer 130. This retainer 130 may be configured as a washer like element mounted to the driveshaft 110. The first gear 124 and the second gear 126 may be laterally captured between the second flange 76 and the retainer 130, which substantially prevents axial movement of the gear system 122.

A bushing 132 may be seated within the second outer pin aperture 62. The second pin 94 projects through and slidingly engages the bushing 132.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

I claim:

1. An assembly configured for use with an aircraft propulsion system, comprising:
   an inner support;
   an intermediate support circumscribing and rotatably attached to the inner support about a first axis;
   an outer support including a first flange and a second flange, the intermediate support arranged laterally between the first flange and the second flange;
   first and second pins rotatably attaching the intermediate support to the outer support about a second axis, the first pin arranged with the first flange, and the second pin arranged with the second flange; and
   a pin actuator comprising a drive element projecting laterally through the outer support, the pin actuator configured to translate the second pin along the second axis upon rotation of the drive element about a rotational axis thereof.

2. The assembly of claim 1, wherein the rotational axis is parallel with the second axis.

3. The assembly of claim 1, wherein the first axis is perpendicular to and coincident with the second axis.

4. The assembly of claim 1, wherein the outer support, the intermediate support and the inner support are arranged together to provide a gimbal joint.

5. The assembly of claim 1, wherein
the pin actuator further comprises a carriage;
the drive element comprises a leadscrew that is mated with the carriage at a threaded interface; and
the second pin is mounted to the carriage.

6. The assembly of claim 5, wherein the threaded interface between the leadscrew and the carriage converts rotational motion of the leadscrew to axial translation of the carriage.

7. The assembly of claim 5, wherein
the carriage is located adjacent the second flange and laterally outside of the outer support;
the second pin projects laterally out from the carriage, through an aperture in the second flange, and into a first aperture in the intermediate support; and
the first pin projects laterally through an aperture in the first flange and into a second aperture in the intermediate support.

8. The assembly of claim 7, wherein the pin actuator further comprises a stop configured with the leadscrew and adapted to prevent the second pin from coming out of the aperture in the second flange.

9. The assembly of claim 5, wherein the carriage is configured with one or more guide pins, and each of the one or more guide pins projects laterally into a respective guide pin aperture in the second flange.

10. The assembly of claim 1, wherein
the pin actuator further comprises a first gear and a second gear,
the first gear is mounted to the drive element; and
the second gear is configured to be driven by the first gear and mated with the second pin at a threaded interface.

11. The assembly of claim 10, wherein the threaded interface between the second gear and the second pin converts rotational motion of the second gear to axial translation of the second pin.

12. The assembly of claim 10, wherein the pin actuator further comprises a retainer, and the first gear and the second gear are laterally captured between the outer support and the retainer.

13. The assembly of claim 10, further comprising a bushing in an aperture in the second flange, wherein the second pin projects through the bushing.

14. The assembly of claim 1, further comprising:
a component of an aircraft propulsion system nacelle; and
a linear actuator;
wherein the outer support is mounted to the component and the inner support is mounted to the linear actuator.

15. The assembly of claim 1, wherein
the outer support extends laterally between a first side and a second side, the first flange is located at the first side, and the second flange is located at the second side; and
the pin actuator is configured to enable disconnection of the first pin and the second pin from the intermediate support from the first side without access to the second side.

16. An assembly configured for use with an aircraft propulsion system, comprising:
an inner support;
an intermediate support circumscribing and rotatably mounted to the inner support about a first axis;
an outer support including a first flange and a second flange, the intermediate support arranged laterally between the first flange and the second flange;
first and second pins rotatably mounting the intermediate support to the outer support about a second axis, the first pin projecting through the first flange to the intermediate support, and the second pin projecting through the second flange to the intermediate support; and
a pin actuator configured to enable disconnection of the first pin and the second pin from the inter intermediate support from a common side of the outer support.

17. The assembly of claim 16, wherein the pin actuator comprises a drive element projecting laterally through the outer support, the pin actuator is further configured to translate the second pin along the second axis upon rotation of the drive element about a rotational axis thereof.

18. The assembly of claim 16, wherein
the pin actuator comprises a rotatable leadscrew and a carriage;
the rotatable leadscrew is mated with the carriage at a threaded interface; and
the second pin is axially fixedly mounted to the carriage.

19. The assembly of claim 16, wherein
the pin actuator comprises a rotatable driveshaft, a first gear and a second gear;
the first gear is mounted to the rotatable driveshaft; and
the second gear is meshed with the first gear and mated with the second pin at a threaded interface.

20. The assembly of claim 16, further comprising:
a thrust reverser component of an aircraft propulsion system nacelle; and
a linear actuator;
wherein the outer support is mounted to the component and the inner support is mounted to the linear actuator.

* * * * *